(12) United States Patent
Chirol et al.

(10) Patent No.: US 9,981,291 B2
(45) Date of Patent: May 29, 2018

(54) POSTAL SORTING EQUIPMENT WITH SHUTTLE ROBOT CARTS THAT TRANSPORT TRAYS

(71) Applicant: Solystic, Bagneux (FR)

(72) Inventors: Luc Chirol, Paris (FR); Francois Madar, Bourg les Valence (FR)

(73) Assignee: SOLYSTIC, Bagneux (FR)

( * ) Notice: Subject to any disclaimer, the term of this patent is extended or adjusted under 35 U.S.C. 154(b) by 73 days.

(21) Appl. No.: 15/316,373

(22) PCT Filed: Sep. 12, 2016

(86) PCT No.: PCT/FR2016/052291
§ 371 (c)(1),
(2) Date: Dec. 5, 2016

(87) PCT Pub. No.: WO2017/046498
PCT Pub. Date: Mar. 23, 2017

(65) Prior Publication Data
US 2017/0266697 A1    Sep. 21, 2017

(30) Foreign Application Priority Data
Sep. 15, 2015  (FR) .................... 15 58620

(51) Int. Cl.
*B07C 3/00* (2006.01)
*G05D 1/00* (2006.01)

(52) U.S. Cl.
CPC ........... *B07C 3/008* (2013.01); *G05D 1/0011* (2013.01)

(58) Field of Classification Search
CPC ..................................................... B07C 3/008
See application file for complete search history.

(56) References Cited

U.S. PATENT DOCUMENTS

| | | | |
|---|---|---|---|
| 2010/0049374 A1* | 2/2010 | Ferrin | G05D 1/0227 701/1 |
| 2010/0316473 A1* | 12/2010 | Cartal | B07C 1/025 414/404 |
| 2010/0318216 A1* | 12/2010 | Faivre | B07C 3/00 700/218 |
| 2011/0180462 A1* | 7/2011 | Cartal | B07C 3/08 209/509 |
| 2011/0211939 A1* | 9/2011 | Hugues | B07C 7/02 414/789.9 |
| 2017/0088355 A1* | 3/2017 | Khodl | B65G 1/1375 |
| 2017/0121114 A1* | 5/2017 | Einav | B65D 21/0235 |

FOREIGN PATENT DOCUMENTS

WO         01/08817 A1    2/2001

* cited by examiner

*Primary Examiner* — Thomas Randazzo
(74) *Attorney, Agent, or Firm* — Ware, Fressola, Maguire & Barber LLP

(57) ABSTRACT

Equipment for handling postal articles, in particular for preparing a delivery round, includes a sorting machine (1) with a feed inlet (2) and sorting outlets (3). The articles (4) sorted into the sorting outlets are transported in storage trays (5) by shuttle robot carts (6). A monitoring and control unit (7) causes the shuttle robot carts with full trays of articles to move from the sorting outlets to the feed inlet and causes the shuttle robot carts with empty trays to move past the sorting outlets, where the shuttle robot carts move in convoys and in a target-seeking mode.

15 Claims, 1 Drawing Sheet

POSTAL SORTING EQUIPMENT WITH SHUTTLE ROBOT CARTS THAT TRANSPORT TRAYS

CROSS REFERENCE TO RELATED APPLICATIONS

This application is the U.S. National Stage of International Application Number PCT/FR2016/052291 filed on Sep. 12, 2016, which application claims priority under 35 USC § 119 to French Patent Application No. 1558620 filed on Sep. 15, 2015. Both applications are hereby incorporated by reference in their entirety.

TECHNICAL FIELD

The present invention relates to equipment for handling postal articles, which equipment includes a sorting machine with a feed inlet and sorting outlets, and storage trays for transporting the sorted articles from the sorting outlets to the feed inlet of the machine, or indeed from the sorting outlets to a removal point at which the sorted articles are removed.

BACKGROUND OF THE INVENTION

Such equipment may advantageously be used in a sorting center for preparing a delivery round or "postman's walk".

Such trays are usually handled by operators who walk past the sorting outlets with a trolley for transporting the trays.

The trolley serves to bring the empty trays to the sorting outlets and to remove the full trays from said sorting outlets so as to transport them to the feed inlet or indeed to the removal point.

Automatic conveying solutions also exist for conveying the trays automatically from the outlets to the feed inlet of the sorting machine. For example, tray conveyor systems are already known that automatically unload the full trays from the sorting outlets and that also load said sorting outlets with empty trays.

SUMMARY OF THE INVENTION

An object of the invention is to propose another solution for transporting the full trays and the empty trays between the sorting outlets and the feed inlet of the machine or indeed a removal point at which the sorting articles are removed.

To this end, the invention provides equipment for handling postal articles comprising a sorting machine with a feed inlet and sorting outlets, and storage trays for transporting the sorted articles from the sorting outlets and the feed inlet of the machine, said equipment being characterized in that it further comprises shuttle robot carts suitable for moving the trays under the control of a monitoring and control unit, said unit being arranged to cause the shuttle robot carts with full trays of articles to move from the sorting outlets to the feed inlet and to cause the shuttle robot carts with empty trays to move past the sorting outlets in a target-seeking mode where a plurality of shuttle robot carts follow an operator in a convoy as the operator is walking past the sorting outlets of the machine.

The basic idea of the invention is for the shuttle robot carts to take charge of the empty trays in the vicinity of the feed inlet of the postal sorting machine. Then, said shuttle robot carts move in convoy (in one or more convoys) past the sorting outlets of the machine. Each convoy of shuttle robots follows an operator who is walking past the sorting outlets so as to unload the full trays from them as the sorting process progresses. The operator transfers a full tray from a sorting outlet to a shuttle robot cart, e.g. the shuttle robot cart at the head of the convoy. The shuttle robot then leaves the convoy and transports the full tray under the control of the monitoring and control unit to the feed inlet of the machine, or indeed, as applicable, to another point at which the sorted articles are removed.

The full tray reaching the feed inlet of the sorting machine is unloaded from the shuttle robot cart and the shuttle robot cart can then be loaded with an empty tray generated by the feed inlet, for example.

The equipment of the invention may have the following features.

The monitoring and control unit is arranged in such a manner that it causes a shuttle robot cart with an empty tray to join a convoy of shuttle robot carts automatically when a shuttle robot cart of the convoy that is loaded with a full tray is moved from a sorting outlet to the feed inlet of the machine.

The monitoring and control unit is arranged to cause a plurality of convoys of shuttle robot carts with empty trays to move past the sorting outlets of the machine.

The monitoring and control unit is arranged to balance the numbers of shuttle robot carts automatically between the various convoys going past the sorting outlets by the shuttle robot carts being shed in cascade from the adjacent convoys.

At each sorting outlet, the sorting machine may have a call member for calling the monitoring and control unit for the purpose of calling for a shuttle robot cart from a convoy of shuttle robot carts with empty trays facing said sorting outlet.

A bridge may be provided that is interposed between a sorting outlet of the machine and a shuttle robot cart designed to be loaded with a full tray of articles, said bridge being designed in such a manner that the machine operator moves said full tray by sliding it towards said shuttle robot cart.

Advantageously, the monitoring and control unit causes the shuttle robot carts with empty trays to move along a first travel path adjacent to the sorting outlets of the machine and causes the shuttle robot carts with full trays to move along a second travel path adjacent to the first travel path.

BRIEF DESCRIPTION OF THE DRAWING

The invention is described below in more detail and is illustrated by the drawing, in which.

DESCRIPTION OF EMBODIMENTS

Figure 1:
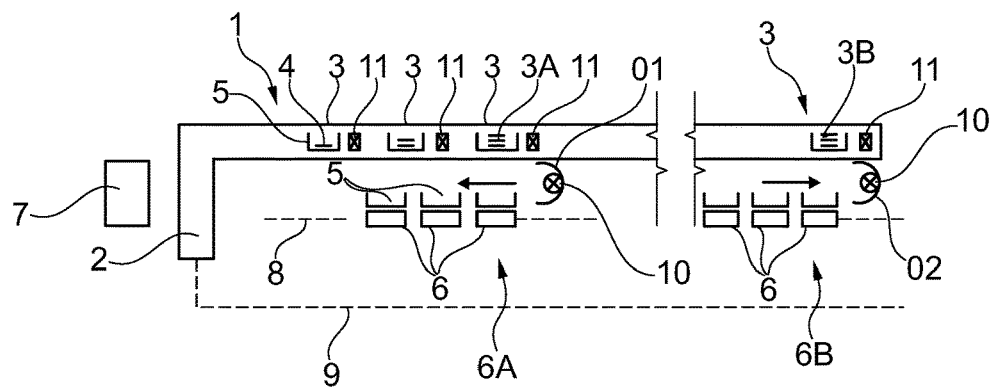
FIG. 1 is a diagrammatic view of equipment for handling postal articles using a sorting machine and shuttle robot carts.

FIG. 1 of the drawing shows equipment for handling postal articles such as letters or parcels, which equipment includes a postal sorting machine 1 with a feed inlet 2 and sorting outlets 3. Such equipment can serve to prepare a delivery round in a postal sorting center.

In this example, the articles such as 4 that are sorted into the sorting outlets 3 are transported in storage trays 5 to the feed inlet 2, in particular for being reloaded into the sorting machine for another sorting pass, or indeed to a removal point at which the sorted articles are removed. In this example, the postal articles 4 are sorted directly into the storage trays 5 of the sorting outlets, but the invention may apply to sorting outlets that have joggers and that are emptied into the storage trays 5.

FIG. 1 shows only a few sorting outlets 3 with storage trays 5 filled with postal articles 4, but a sorting machine of the invention may have a very large number of sorting outlets 3.

FIG. 1 also shows two machine operators O1 and O2, each of whom is stationed on one side of a respective sorting outlet. The invention may extend to a larger number of operators.

In accordance with the invention, the equipment includes shuttle robot carts 6 for transporting the trays 5 from the sorting outlets 3 to the feed inlet 2 or indeed to a removal point at which the sorted articles are removed. The shuttle robot carts are remotely controlled mobile motor-driven units. In the example, the trays are placed on mobile trolleys coupled to respective shuttle robot carts so as to be moved on the floor.

In particular, in accordance with the invention, said shuttle robot carts transport storage trays 5 filled with postal articles from the sorting outlets 3 to the feed inlet 2 or indeed to a removal point at which the sorted articles are removed, and said shuttle robot carts transport empty trays 5 from the feed inlet 2 to the sorting outlets 3. In this example, the empty trays are loaded onto trolleys in the vicinity of the feed inlet 2.

The shuttle robot carts 6 are caused to move by a monitoring and control unit 7.

In accordance with the invention, this unit 7 is arranged to cause the shuttle robot carts loaded with full trays to move from the sorting outlets to the feed inlet so as to recycle the articles in another machine sorting pass.

The unit 7 is arranged to control the movement of the shuttle robot carts 6 by assigning a destination three-dimensional (3D) position to each of them. The unit 7 is also arranged to cause the shuttle robot carts loaded with empty trays to move past the sorting outlets in a particular movement mode referred to as "target-seeking" mode in which a plurality of shuttle robot carts follow in convoy an operator who is walking past the sorting outlets. In this target-seeking mode, each convoy of shuttle robot carts (and thus the shuttle robot cart at the head of the convoy) follows, for example, a beacon 10 that is carried or worn by an operator who is walking past the sorting outlets of the machine.

As can be seen in FIG. 1, the operator O1 is carrying or wearing a beacon 10. The convoy 6A of shuttle robot carts 6 follows the movement of the beacon 10 of the Operator O1 who can move leftwards as indicated by an arrow in FIG. 1 or indeed rightwards. The convoy 6B of shuttle robot carts 6 follows the movement of the beacon 10 of the operator O2 who can move rightwards as indicated by an arrow in FIG. 1 or indeed leftwards.

FIG. 1 also shows, in dashed lines, a first travel path 8 along which the shuttle robot carts travel past the sorting outlets 3 and along which the shuttle robot carts 6 that are transporting empty trays move in convoys, and a second travel path 9, that runs alongside the path 8, along which the shuttle robot carts 6 that are transporting the full trays travel to the feed inlet 2 or indeed to a removal point at which the sorted articles are removed.

As can be seen in FIG. 1, the path 9 is, in this example, farther towards the outside of the sorting machine than the path 8.

While the equipment is operating, and when a tray is full in a sorting outlet like the outlet 3A or 3B in FIG. 1, the operator placed on one side of the sorting outlet calls a shuttle robot cart 6 that is part of the convey of shuttle robot carts 6A or 6B that is following the movement of the operator to position itself facing said sorting outlet.

This call may be triggered by pushing a control button 11 disposed in the vicinity of the sorting outlet in question, thereby actuating the unit 7.

In the illustration of FIG. 1, the convoy 6A of shuttle robot carts is formed in the vicinity of the sorting outlet 3A where the operator O1 is standing. Each shuttle robot cart 6 of this convey 6A carries an empty storage tray 5. In this example, the shuttle robot cart 6 at the head of the convoy is situated facing the sorting outlet to be unloaded and where the operator O1 is positioned.

Figure 2:
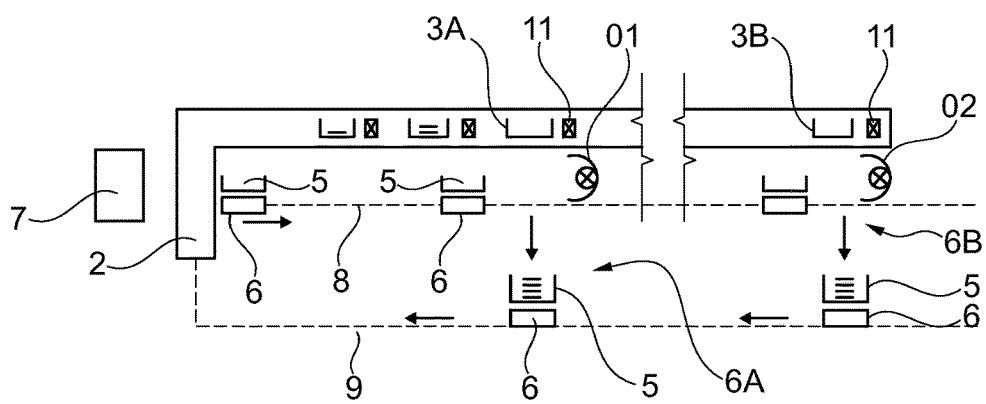
FIG. 2 is a highly diagrammatic view of a state of the equipment while trays are being conveyed by shuttle robot carts.
Figure 4:
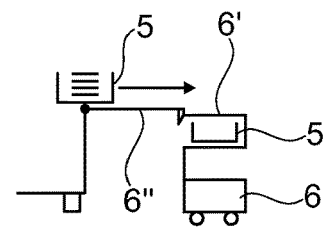
FIG. 4 diagrammatically shows a full tray being transferred from a sorting outlet to a shuttle robot cart loaded with an empty tray.

The operator O1 then changes the trays over in the sorting outlet 3A as shown in FIG. 2. The full tray 5 of the outlet 3A is, in this example, loaded onto the shuttle robot cart at the head of the convoy 6A and the empty tray loaded on the shuttle robot cart is placed in the sorting outlet 3A. The same transfer operation may be performed at the same time for the operator O2 with the convoy 6B. To facilitate this operation of transferring a tray from a sorting outlet to a shuttle robot cart (with its trolley), it is possible to use a sort of bridge that can be interposed between the sorting outlet and the trolley of the shuttle robot cart, and that is designed so that the operator moves the full tray merely by sliding it horizontally from the sorting outlet to the shuttle cart trolley. The trolley is advantageously a trolley having two racks for enabling the full tray and the empty tray to be placed in superposed manner as shown in FIG. 4, which shows in profile the outlet 3A with a shuttle robot cart 6, a trolley 6' having two racks, with an empty tray 5 loaded on its lower rack, and with the trolley 6' waiting for a full tray 5 to be loaded onto its upper rack by being slid horizontally (as indicated by the arrow) along the bridge 6". Then the operator O1 actuates the unit 7 (e.g. by means of the control button 11 of the sorting outlet 3A) so that it causes the shuttle robot cart loaded with the full tray to move to the feed inlet 2 of the machine or indeed to a removal point at which the sorted articles are removed, as illustrated by the arrows in FIG. 2. In this operation, the shuttle robot cart crosses path 8 to reach path 9.

At the same time, the unit 7 causes another shuttle robot cart 6 loaded with an empty tray to move so that it automatically joins the convoy 6A of shuttle robot carts in such a manner as to distribute the shuttle robot carts between the operators O1 an O2.

At the feed inlet 2 of the sorting machine, the full tray on the shuttle robot cart 6 is unloaded and replaced with an empty tray. Under the control of the unit 7, the shuttle robot cart then comes back in convoy along the travel path 8 at the back of the convoy 6A of shuttle robot carts.

The unit 7 is suitable for automatically balancing the numbers of shuttle robot carts in the various conveys 6A and 6B along the path 8 by causing the adjacent convoys to shed them in cascade.

Figure 3:
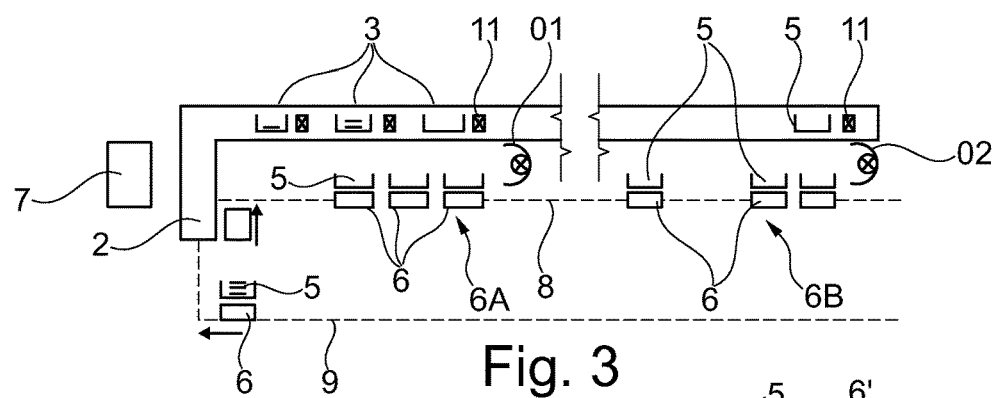
FIG. 3 shows another state of the equipment while a shuttle robot cart is being automatically brought to join a convoy of shuttle robot carts.

By way of example, FIG. 3 shows the shuttle robot cart at the head of the convoy 6A that comes to join the tail of the convey 6B in such a manner that the two convoys 6A and 6B have the same number of shuttle robot carts.

The unit 7 is designed to perform this balancing process with shedding as the full trays in the sorting outlets are transferred by the shuttle robot carts to the feed inlet 2 of the machine or to another point at which they are unloaded.

It is understood that the process of balancing with shedding is independent of the movements of the operators O1 and O2 past the sorting outlets.

The number of shuttle robot carts per convoy can be an adjustable parameter of the equipment that depends, inter alia, on the number of sorting outlets of the machine and on the number of operators assigned to emptying the sorting outlets.

The beacon 10 is advantageously a beacon for three-dimensionally locating the machine operator, thereby enabling the unit 7 to manage, in real time, travel of the convoys of shuttle robot carts in target-seeking mode for seeking targets on the machine operators.

With the invention, it is also possible to put into sequence the full trays brought by the shuttle robot carts from the sorting outlets in such a manner as to cause the unit 7 to perform a process of sorting the postal articles for preparing the delivery round, the unit 7 causing the full trays to return in sequence from the sorting outlets of the machine to the feed inlet of the machine.

What is claimed is:

1. An equipment for handling postal articles comprising a sorting machine with a feed inlet, and sorting outlets, storage trays for transporting sorted articles from the sorting outlets and the feed inlet of the machine, and shuttle robot carts configured to move the trays under the control of a monitoring and control unit, said monitoring and control unit configured to cause the shuttle robot carts with full trays of articles to move from the sorting outlets to the feed inlet and to cause the shuttle robot carts with empty trays to move past the sorting outlets in a target-seeking mode where a plurality of shuttle robot carts follow an operator in a convoy as the operator is walking past the sorting outlets of the machine.

2. The equipment according to claim 1, wherein at each sorting outlet, the sorting machine has a call member for calling the monitoring and control unit for the purpose of calling for a shuttle robot cart from a convoy of shuttle robot carts with empty trays facing said sorting outlet.

3. The equipment according to claim 1, wherein a bridge is provided that is interposed between a sorting outlet of the machine and a shuttle robot cart designed to be loaded with a full tray of articles, said bridge being configured so that the machine operator moves said full tray by sliding it towards said shuttle robot cart.

4. The equipment according to claim 1, wherein the monitoring and control unit causes the shuttle robot carts with empty trays to move along a first travel path adjacent to the sorting outlets of the machine and causes the shuttle robot carts with full trays to move along a second travel path adjacent to the first travel path.

5. The equipment according to claim 1, wherein the monitoring and control unit is configured to cause the shuttle robot carts with full trays to move from the sorting outlets to a removal point at which the articles are removed.

6. The equipment according to claim 1, wherein the monitoring and control unit is configured to cause a plurality of convoys of shuttle robot carts with empty trays to move past the sorting outlets of the machine.

7. The equipment according to claim 6, wherein the monitoring and control unit is configured to distribute the shuttle robot carts automatically between the various convoys going past the sorting outlets by the shuttle robot carts being shed in cascade from the adjacent convoys.

8. The equipment according to claim 1, wherein the monitoring and control unit is configured to cause a shuttle robot cart with an empty tray to join a convoy of shuttle robot carts automatically when a shuttle robot cart of the convoy that is loaded with a full tray is moved from a sorting outlet to the feed inlet of the machine.

9. The equipment according to claim 8, wherein the monitoring and control unit is configured to cause a plurality of convoys of shuttle robot carts with empty trays to move past the sorting outlets of the machine.

10. The equipment according to claim 9, wherein the monitoring and control unit is configured to distribute the shuttle robot carts automatically between the various convoys going past the sorting outlets by the shuttle robot carts being shed in cascade from the adjacent convoys.

11. The equipment according to claim 10, wherein at each sorting outlet, the sorting machine has a call member for calling the monitoring and control unit for the purpose of calling for a shuttle robot cart from a convoy of shuttle robot carts with empty trays facing said sorting outlet.

12. The equipment according to claim 11, wherein a bridge is provided that is interposed between a sorting outlet of the machine and a shuttle robot cart designed to be loaded with a full tray of articles, said bridge being configured so that the machine operator moves said full tray by sliding it towards said shuttle robot cart.

13. The equipment according to claim 12, wherein the monitoring and control unit causes the shuttle robot carts with empty trays to move along a first travel path adjacent to the sorting outlets of the machine and causes the shuttle robot carts with full trays to move along a second travel path adjacent to the first travel path.

14. The equipment according to claim 13, wherein the monitoring and control unit is configured to cause the shuttle robot carts with full trays to move from the sorting outlets to a removal point at which the articles are removed.

15. A method of sorting postal articles for preparing a delivery round, comprising moving storage trays under the control of a monitoring and control unit so as to cause shuttle robot carts with full trays of articles to move from sorting outlets of a sorting machine to a feed inlet of said sorting machine and to cause the shuttle robot carts with empty trays to move past the sorting outlets in a target-seeking mode where a plurality of shuttle robot carts follow an operator in a convoy as the operator is walking past the sorted outlets of the sorting machine, wherein full trays are returned in sequence from the sorting outlets of the sorting machine to the feed inlet of the sorting machine.

* * * * *